June 25, 1940.  J. W. TEKER  2,205,892
BEARING LUBRICATING SYSTEM
Filed May 21, 1938
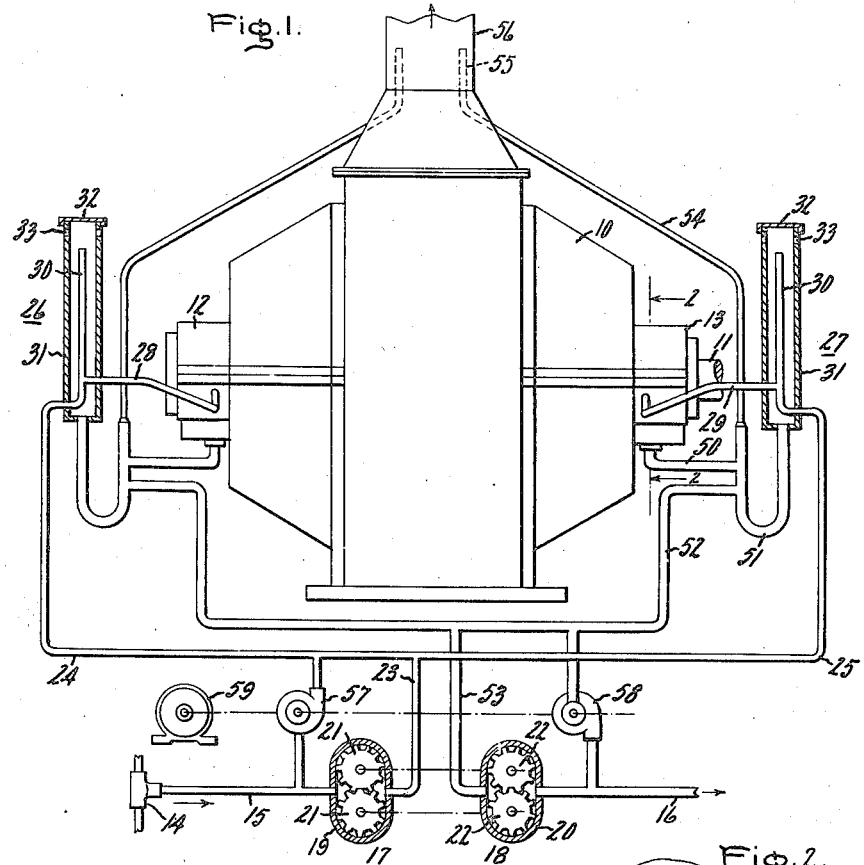
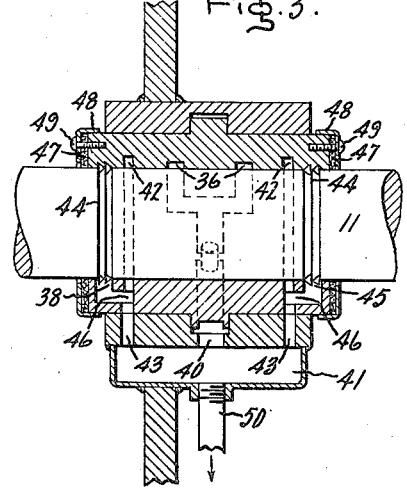
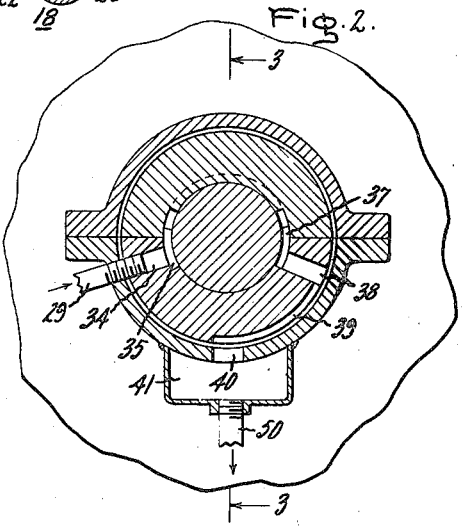
Inventor:
John W. Teker,
by Harry E. Dunham
His Attorney.

Patented June 25, 1940

2,205,892

UNITED STATES PATENT OFFICE 2,205,892

BEARING LUBRICATING SYSTEM

John W. Teker, Erie, Pa., assignor to General Electric Company, a corporation of New York Application May 21, 1938, Serial No. 209,272

6 Claims. (Cl. 184—6)

This invention relates to bearing lubricating systems and while not necessarily limited thereto, it is particularly adaptable for dynamoelectric machines.

My present invention is an improvement over the invention of the Cain application, Serial No. 209,291, filed May 21, 1938, and assigned to the General Electric Company which invention was made by the said Basil S. Cain prior to my invention. I, therefore, do not herein claim anything shown or described in said Cain application, which is to be regarded as prior art with respect to this present application.

In certain instances it is preferred to lubricate bearings by means of a forced feed system. In such lubricating systems variations in oil pressure may obtain and excess pressures may result in the flooding of the bearings and consequent leakage of oil onto various parts of the machine structure. In some machines such accidental flooding of the bearings may not prove injurious but in the case of dynamoelectric machines it may give rise to much consequential damage. If the machine is working under load, the oil leaking into the heated interior of the machine may become vaporized which vapors are likely to be ignited by the sparking occurring between the commutator and brushes. In addition to this fire hazard, the leaking oil may cause considerable damage to the internal installation of the machine and gumming of the commutator surface and the brush holders. Also during the normal functioning of the lubrication system, oil vapors or fumes escaping from the bearing housing may pass into the interior of the machine giving rise to a fire hazard. If not ignited by the sparking commutator, the vapors may condense on the windings, commutator, brushes or other machine parts and cause serious damage thereto.

It is an object of my invention to provide a new and improved lubricating system for bearings in which oil is supplied thereto under a predetermined maximum pressure head and is drained therefrom in a manner so as to preclude leakage of oil or fumes into the interior of the machines.

For a consideration of what I believe to be novel and my invention, attention is directed to the following description and the claims appended thereto taken in connection with the accompanying drawing.

In the drawing, Fig. 1 illustrates a dynamoelectric machine provided with a bearing lubricating system according to my invention; Fig. 2 is a cross-sectional view of one of the bearings of the dynamoelectric machine shown in Fig. 1 taken along the line 2—2; and Fig. 3 is a longitudinal cross-section view of the bearing taken along the line 3—3.

Referring to Fig. 1 of the drawing, 10 is a dynamoelectric machine having a rotor shaft 11 mounted within the bearings 12 and 13. Oil under pressure from a source of supply 14 extending from the power plant lubricating system is supplied through the conduit 15 to the bearing lubricating arrangement and, after passing therethrough, the oil is returned to the reservoir of the system by means of the drain conduit 16. To insure proper circulation of the lubricating oil through the bearings, a motor 17 and a directly connected pump 18 are provided in the supply and drain conduits 15 and 16, respectively. Although any suitable motor and pump combination may be used, I have shown the devices as being similar in construction comprising individual casings 19 and 20 having pairs of gears 21 and 22 provided in each casing, respectively. The lubricating oil under pressure in flowing through the motor 17 rotates the gears thereof and since the corresponding gears of the two devices are mounted on common shafts, as indicated, the pump will be rotated at a like speed. Thus, as the oil is supplied by pressure to the bearings, it is pumped therefrom at substantially the same rate minimizing the possibilities of clogging of the drain lines and flooding of the bearings as a result thereof.

From the motor 17, the oil passes through the conduit 23 and branch feeders 24 and 25 to the pressure limiting devices 26 and 27 and therefrom through conduits 28 and 29 to the bearings 12 and 13, respectively. Since the lubricating arrangements for both bearings are similar, only one will be described in detail, namely, the arrangement associated with the bearing 13 at the right-hand side of the machine. The pressure limiting device connected in the supply line 25 comprises a vertically arranged overflow pipe 30, shown as an extension of the conduit 25, mounted within a surrounding chamber or tubular casing 31. The tubular casing is provided at the upper end thereof with a cap 32 and vent openings 33. The connection 29 in communication with the overflow pipe 30 near the lower end thereof conducts oil therefrom to the machine bearing. The pressure limiting device is preferably positioned adjacent the bearing with the upper end of the overflow pipe 30 extending to a suitable level above the bearing as determined by the pressure head deemed most desirable for proper lubrication of the bearing without danger of flooding it due to excess pressure. In operation, it is understood that the pressure on the oil flowing through the conduit 25 and into the pressure limiting device is such that a more or less continuous flow of oil passes from the upper end of the pipe 30 so that the pressure on the oil supplied to the bearing through connection 29 is substantially constant regardless of variations in pressure from the source of supply.

Any suitable type of bearing may be used with this system such as that shown in Figs. 2 and 3. The oil supplied through the connection 29 is received in a passage 34 provided in the lower bearing part from which it is distributed across the shaft surface through a transverse groove 35 and semi-annular grooves 36 which latter grooves are provided in the upper bearing part. From the grooves 36 the oil flows into a second transverse groove 37 and therefrom through the passage 38 and the circumferential passage 39 provided in the lower bearing part, through the passage 40 and into the sump chamber 41. For collecting the oil which spreads outwardly along the shaft from the centrally disposed grooves, annular grooves 42 are provided in the stationary bearing part adjacent the ends of the bearing surface which annular grooves communicate as by passages 43 with the sump chamber. Any oil which creeps past the collector grooves 42 is thrown by the slingers 44 provided on the shaft 11 into the surrounding annular grooves 45 from which such oil is drained into the sump chamber through passages 46 which communicate with the drain passages 43. Felt packing washers 47 held by retainers 48 and screws 49 are provided on the outer ends of the bearing for minimizing the passage of dust and air into the bearing.

Oil is drained from the sump chamber 41 by means of a connection 50 which communicates with the left-hand side of a vertically arranged U-tube 51. The right-hand side of the U-tube is in communication with the lower portion of the pressure limiting device casing 31 for draining the oil overflow therefrom. Oil is withdrawn from the U-tube through a conduit 52 communicating therewith at a point below the outlet of the connection 50 and above the lower portion of the U-tube and through conduit 53 by means of the pump 18 which in turn discharges the oil through the conduit 16 to the reservoir (not shown). As indicated, the conduits 52, 53 and 16 are somewhat larger in diameter than the supply conduits of the system and the pump 18 is preferably of a somewhat greater capacity than that of the motor 17 so as to facilitate the complete drainage of the oil return system at all times.

Means are provided for reducing the pressure at the outlet of the bearing drain connection 50 in the left-hand side of the U-tube so that any fumes or vapor created within the bearing housing will be drawn through the drain connection rather than pass out along the shaft and into the interior of the machine where such vapors might give rise to a fire hazard or condense upon the various parts of the machine. Any suitable means may be provided for creating a suction upon the drain connection 50 such as that shown in the drawing. Extending from the upper end of the left-hand side of the U-tube is a vent pipe 54, the end 55 of which extends into the exhaust hood 56 of the dynamoelectric machine ventilating system in such a manner that a suction is created within the vent pipe by Venturi action. Accordingly, the pressure within the upper portion of the left-hand side of the U-tube will be suitably reduced below atmospheric pressure so that normally a certain amount of air will be drawn past the felt packing washers 47, through the bearing clearances, into the sump chamber 41, and through the connection 50 together with the oil being drained therethrough. By reason of the trap formed by the oil filled lower portion of the U-tube, air will not be drawn through the vent openings 33 provided in the casing 31 whereby the condition of reduced pressure at the outlet of the connection 50 may be more easily maintained.

To safeguard against damage to the bearings by lack of oil due to a failure of pressure upon the source of supply, I prefer to provide auxiliary pumping means in the system to insure a proper circulation of oil through the bearings upon such a condition obtaining. As shown, pumps 57 and 58 are provided in parallel relationship with the gear motor 17 and the gear pump 18, respectively. The pumps 57 and 58 may be of any suitable type directly connected by a common shaft and driven by a suitable electric motor 59 which may be adapted to be energized only upon a predetermined decrease of pressure of the oil supply or it may be operated continuously with the gear motor and pump combination. In the latter case, upon a failure of the power supply to the motor 59, the motor and pump combination 17—18 may continue the circulation of oil through the bearing system should the pressure of the source of supply be sufficient.

Having described the method of operation of my invention together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. In a dynamoelectric machine having a forced draft ventilating means, a lubricating system for a bearing of said machine comprising conduit means for conducting lubricating oil under pressure to said bearing, means including an overflow pipe extending to a level above said bearing in communication with said conduit means adjacent said bearing for limiting the oil pressure in said conduit, a chamber for receiving the overflow from said overflow pipe, a drain conduit for conducting oil from said chamber and said bearing, a portion of said drain conduit between the chamber and bearing connections being normally fluid filled forming a trap, means for withdrawing oil from said drain conduit above said trap and below said bearing drain connection, a vent pipe in communication with the bearing drain connection and the ventilating means of said machine, said vent pipe being so arranged with respect to said ventilating means that a suction is created upon said bearing drain connection.

2. A lubricating system comprising a bearing, oil pumping means, a conduit extending from said pumping means to a predetermined level above said bearing, a casing surrounding the end of said conduit, a connection between said conduit and said bearing, a U-tube, one side of said U-tube being in communication with the lower portion of said casing, a connection for draining said bearing into the second side of said U-tube, a conduit for withdrawing oil from said tube at a point below said bearing drain connection and above the lower portion of said tube, and means for reducing the pressure in the second side of said U-tube above said bearing drain connection.

3. A bearing lubricating system comprising a bearing, a conduit for conducting lubricating oil under pressure to said bearing, means including an overflow pipe extending to a level above said bearing in communication with said conduit adjacent said bearing for limiting the oil pressure in said conduit, a chamber for receiving the overflow from said pressure limiting means, a drain conduit for conducting oil from said chamber and said bearing, a trap comprising a normally oil filled portion of said drain conduit between the chamber and bearing drain connections, pumping means for withdrawing oil from said drain conduit above said trap and below said bearing drain connection, venting means in communication with the bearing drain connection for reducing the pressure therein below atmospheric pressure.

4. A bearing lubricating system comprising a bearing, a source of lubricating oil under pressure, a conduit means for conducting oil from said source to said bearing, pressure limiting means including an overflow pipe in communication with said conduit adjacent said bearing, a casing for receiving the overflow therefrom, a drain conduit in communication with said casing and said bearing for conducting oil therefrom, and means in communication with said drain conduit for reducing the pressure therein below atmospheric pressure.

5. A lubricating system comprising a bearing, oil pumping means, a conduit extending from said pumping means to a predetermined level above said bearing, a chamber surrounding the upper end of said conduit for receiving the overflow therefrom, means for draining said chamber, a connection with said conduit extending from a point below the upper end of said conduit to said bearing, conduit means for draining the oil from said bearing, and means in communication with said last mentioned conduit means for withdrawing oil vapors from said bearing.

6. A lubricating system comprising a bearing, a source of lubricating oil under pressure, conduit means for feeding oil to said bearing, an overflow pipe connected to the conduit means, a casing for receiving oil overflowing from the pipe, a drain conduit connected to the casing, said drain conduit being also connected to said bearing for draining the oil therefrom, and means communicating with said drain conduit and extending above the level of said bearing for reducing the pressure in said bearing and for conducting oil vapors therefrom.

JOHN W. TEKER.